Sept. 20, 1971      K. A. ALBERS      3,606,598

FLUID OPERATED MOTOR

Filed April 8, 1970      2 Sheets-Sheet 1

INVENTOR.
KENNETH A. ALBERS
BY
Robert W. Royle
ATTORNEY

United States Patent Office 3,606,598
Patented Sept. 20, 1971

3,606,598
FLUID OPERATED MOTOR
Kenneth A. Albers, Bloomington, Minn., assignor to
Eaton Yale & Towne Inc., Cleveland, Ohio
Filed Apr. 8, 1970, Ser. No. 26,636
Int. Cl. F01c *1/02;* F03c *3/00;* F04b *35/02*
U.S. Cl. 418—61                                     8 Claims

ABSTRACT OF THE DISCLOSURE

A fluid operated motor of the gerotor displacement mechanism and axial valve type wherein the gerotor displacement mechanism and fluid displaced therein is isolated from operating fluid controlled by the motor valve and wherein the displacement mechanism fluid is responsive to operating fluid controlled by the valve thereby increasing the efficiency of the motor.

---

This invention relates to fluid operated motors and, more particularly, relates to fluid operated motors of the gerotor displacement mechanism and axial valve type wherein fluid displaced in the displacement mechanism is isolated from fluid controlled by the motor valve whereby the motor's displacement mechanism may be operated by a high viscosity fluid which will not leak between expanding and contracting cells, but which fluid is isolated from the operating fluid whereby a highly efficient displacement mechanism results with corresponding over-all motor efficiency being provided.

BACKGROUND OF THE INVENTION

Although fluid operated motors of the axial valve and gerotor displacement mechanism type have been utilized in the past, the application of these motors has been limited, to a certain degree, because of their inability to function efficiently when operating fluid under high pressure was used. Typically, as the pressure of the operating fluid would increase, the displace-mechanism efficiency would decrease. In a gerotor type displacement mechanism, loss of efficiency is experienced at leakage paths which conduct fluid from the high pressure side of the displacement mechanism on one side of the line of eccentricity to the low pressure side on the other side of the line of eccentricity. This leakage is typically over the point of the star as it contacts the lobe of the outer ring member. Other leakage takes place transversely between the displacement mechanism and the transverse valve plate, on one side thereof and between the displacement mechanism and end cap on the other side thereof.

Many attempts have been made to design and manufacture a gerotor mechanism eliminating these leakage paths. However, these attempts have met with only moderate success because of the limitations of known manufacturing techniques and the complexity of the design of the gerotor mechanism. Further, the high cost of the gerotor displacement mechanism, which results from the close tolerance machining requirements, is obviously undesirable. Although the efficiency of the displacement mechanism increases as the machining tolerances are increased, the increased efficiency does not offset the increased cost based on manufacture under known manufacturing techniques.

With these comments in mind, it is to the elimination of these and other disadvantages to which the present invention is directed, along with the inclusion therein of other novel and desirable features.

OBJECTS OF THE INVENTION

An object of this invention is to provide a new and improved fluid operated motor of simple and inexpensive construction and operation.

Another object of this invention is the provision of a fluid operated motor of the axial valve type capable of functioning efficiently and properly under high operating pressures.

Still another object of this invention is the provision of a novel fluid operated motor wherein the operating fluid for the gerotor type displacement mechanism is isolated from the operating fluid for the motor, and wherein the displacement mechanism is responsive to the operating fluid of the system within which the motor functions.

A further object of this invention is the provision of a fluid operated motor capable of efficient and long life operation under high pressures and wherein the operation of the motor is not affected by normal wear of motor components.

A still further object of this invention is the provision of a new and novel fluid operated motor having a gerotor type displacement mechanism which requires a minimum of machining and therefore corresponding low cost, yet is capable of providing efficient performance under high system pressures.

These and other objects and advantages of this invention will more fully appear from the following description made in connection with the accompanying drawing, wherein like reference characters refer to the same or similar parts throughout the several views.

DESCRIPTION OF A PREFERRED EMBODIMENT

Figure 1:
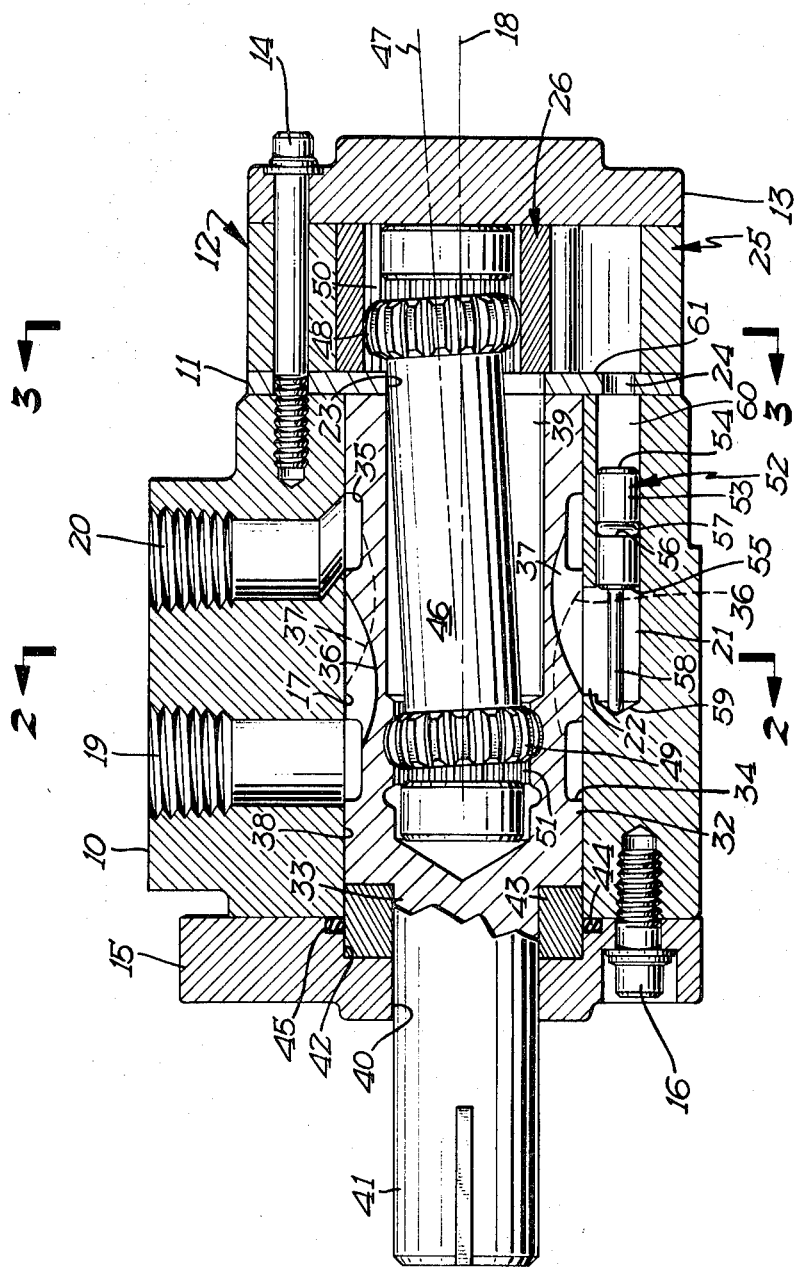
FIG. 1 is a longitudinal sectional view of the fluid operated motor of this invention taken along the line 1—1 of FIG. 2.

The fluid operated motor shown in FIG. 1 is generally cylindrically shaped and comprises several sections. A valve housing section is indicated at 10. A valve plate section 11 is positioned adjacent valve housing 10, and a gerotor type displacement mechanism 12 is positioned adjacent valve plate section 11, sandwiching valve plate 11 between valve housing section 10 and gerotor type displacement mechanism 12. An end cover plate 13 is positioned adjacent gerotor set 12, sandwiching it between the cover plate and the valve plate. A plurality of axially extending bolts 14 join the cover plate with the gerotor set, the valve plate and the valve housing section thereby forming a generally cylindrical shaped motor frame or body. Front cover plate 15 is attached to valve housing section 10 by a plurality of axially extending bolts 16.

Valve housing section 10 includes a valve receiving bore 17 extending along the longitudinal axis 18 of the motor. Ports 19 and 20 are provided in housing section 10 to conduct inlet and exhaust fluid and communicate with internal bore 17 and depending upon the desired direction of rotation of the output shafts, one port conducts inlet fluid, the other exhaust fluid. Valve housing section 10 also includes a plurality of axially extending and circumferentially spaced cylindrically shaped piston receiving passages adapted to receive a piston positioned therein for slideable movement in the axial direction. Each passage 21 includes an opening 22 in housing 10 providing fluid communication between bore 17 and passage 21.

Valve plate section 11 includes a bore 23, which is concentric with bore 17 of valve housing section 10. Valve plate section 11 is stationary and includes a plurality of fluid receiving passages 24 corresponding in number and position, and in fluid communication with, the plurality of passages 21 of valve housing section 10.

Figure 3:
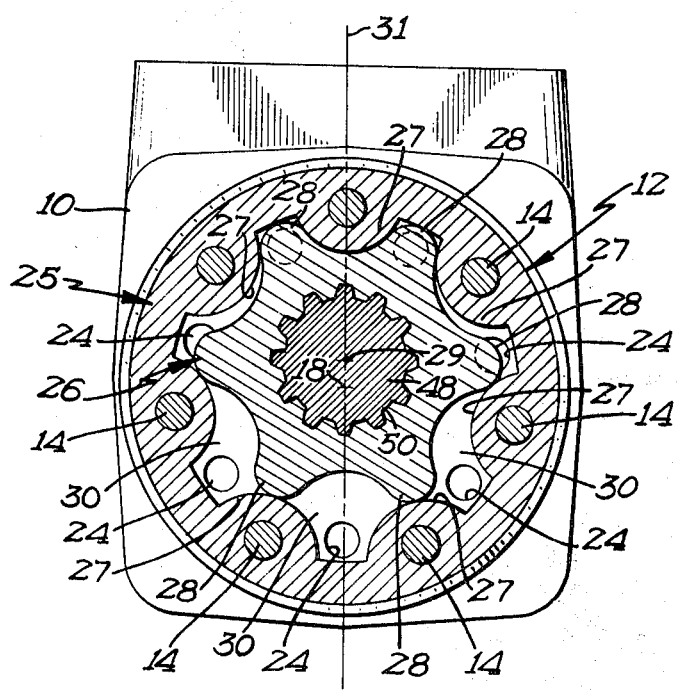
FIG. 3 is a sectional view taken along the line 3—3 of FIG. 1.

Referring now to displacement mechanism 12, the structure thereof is best shown in FIG. 3, and comprises an internally toothed or lobed outer ring gear 25 and a mating externally toothed internal star gear 26. Ring gear 25 has an axis coextensive with axis 18 and a plurality of internal teeth or lobes 27. Mating star gear 26 has a plurality of external teeth 28 numbering one fewer than the internal teeth 27 of ring gear 25. Star gear 26 is eccentrically disposed in ring gear 25. The star gear orbits relative to the ring gear about axis 18 and rotates on its own axis 29 in the opposite direction. During this movement, external teeth 28 of star gear 26 mesh with ring gear teeth 27 in sealing engagement to form expanding and contracting cells 30 which are equal in number to the numer of teeth of ring gear 25. Displacement mechanism 12 is adapted to contain displacement fluid having a viscosity greater than the system operating fluid. Cells 30 are responsive to system operating fluid in passages 21 as will be described hereinbelow.

A line of eccentricity for displacement mechanism 12 is shown by centerline 31 and is defined as that line which passes through axis 18 and axis 29. The line of eccentricity separates cells 30 which are under pressure from cells 30 which are under exhaust. The function of a gerotor set is well-known and will not be described in detail herein. The star and ring gears are typically constructed of hardened steel, although other materials may be used if desired.

A cylindrically shaped axial valve 32, having an outer diameter substantially corresponding to the inner diameter of bore 17, is rotatably mounted in valve housing section 10 for rotational motion in bore 17 about longitudinal axis 18. Valve 32 is in precision fit relative to bore 17. Output shaft 33 is mounted in valve housing section 10 for rotation about axis 18. Shaft 33 is shown as integral with valve 32, although it should be noted that the valve and shaft could be separate, for example, by providing a concentric valve or by attaching the shaft to the valve at a predetermined transverse plane. The valve and shaft are typically constructed of hardened steel.

Valve 32 is a commutating type valve, well-known in the art. It is considered an axial valve and includes a pair of annular and axially spaced ring grooves 34 and 35. Ring groove 34 is shown in fluid communication with port 19 and ring groove 35 is shown in fluid communication with port 20. Valve 32 includes a plurality of axially extending slots 36 which are circumferentially spaced and in fluid communication with annular groove 34. The commutating valve also includes a plurality of axially extending slots 37 which are circumferentially spaced and positioned alternately between slots 36. Slots 37 are in fluid communication with annular groove 35. Slots 36 and 37 alternately communicate with openings 22 in valve housing section 10. Valve 32 is operatively connected to star gear 26, described hereinbelow, and rotates in synchronism therewith. During rotation of valve 32, slots 36 and 37 provide fluid under pressure and conduct exhaust fluid to and from openings 22. In the motor shown the star gear has six teeth and the ring gear has seven teeth; the valve includes six slots 36 and six alternately arranged slots 37. In the event a star gear having more than six teeth is used, the ring gear will include one more tooth than the star gear and each set of corresponding valve slots will be increased to equal the number to the star teeth. For the gerotor set shown, the star gear rotates about its axis 29 at ⅙ the orbiting speed of star gear axis 29 about motor axis 18. Obviously, this ratio changes as the ratio of star gear teeth to the ring gear teeth changes.

Output shaft 33, and integral valve 32, includes an internal bore 39 axially oriented along axis 18 and adapted to receive a drive member. Shaft 33, and valve 32, is assembled in bore 17 of housing 10 and is supported therein for rotation about motor axis 18. Front cover plate 15 includes bore 40 which is concentric with axis 18 and adapted to receive output shaft 33 at the journalled portion 41 thereof. Counterbore 42 in front cover plate 15 is adapted to receive a supporting collar or bearing 43 providing additional support at the journalled portion 41 of shaft 33. Seal 44 is positioned in counterbore 45 in front cover plate 15. Counterbore 45 is concentric with axis 18.

A drive member 46 joins shaft 33 (and integral valve 32) with the gerotor displacement mechanism 12 by connection to star member 26. The drive member is elongated, having its axis 47 oriented generally along motor axis 18, but at a slight angle thereto to accommodate the eccentricity of star gear 26 relative to ring gear 25. Drive member 46 is always in this slightly angular position relative to motor axis 18 as it functions during operation of the motor. Drive member 46 includes a rear head element 48 and a front head element 49. Each head element typically has frusto-spherically shaped splines which are equal in number to, and mesh with, corresponding internal splines 50 and 51 in star gear 26 and in bore 39 of shaft 33 respectively. Since rear head element 48 is positioned in star gear 26 at the internal splines 50 thereof, it is subjected to rotational and orbiting movement. However, drive member front head element 49 has rotational movement only. The frusto-spherically shaped heads, in cooperation with the spline connections, function as a type of universal joint which allows drive member 46 to cancel the orbiting motion of the star, translating only the rotational movement thereof.

Piston receiving passages 21 include fluid interrupting pistons 52 slideably mounted therein for axial movement therealong. Each fluid interrupting piston includes a head element 53 having a transverse displacement mechanism fluid confronting surface 54 and a transverse operating fluid confronting surface 55. Piston head element 53 includes an annular groove 56 having an O-ring mounted therein to provide tight sealing engagement between fluid interrupting piston 52 and passage 21 during the sliding motion of the piston within the passage. In this manner, there is total separation between the displacement mechanism fluid and the operating fluid. Indexing rod 58 is attached to the operating fluid confronting surface 55 and extends outwardly and axially therefrom. Indexing rod 58 is of such a length that opening 22 is not blocked to operating fluid. FIG. 1 shows piston 52 in a position corresponding to passage 21 being in registry with a corresponding collapsed cell. At the instant during operation of the motor shown in FIG. 1, rod 58 engages surface 59 preventing further travel of piston 52 away from valve plate 11. It should be noted that the diameter of each piston head element 53 is substantially greater than the diameter of each valve plate opening 24. Therefore, travel of fluid interrupting piston 52 toward displacement mechanism 12 is indexed or terminated by the contact of displacement fluid confronting surface 54 at plate 11.

A plurality of variable volumes 60 are each defined by fluid confronting surface 54, valve plate surface 61, and the cylindrical portions of passage 21 and valve plate opening 24 confined therebetween. These volumes correspond in number to the number of cells 30. For the position of fluid interrupting piston 52 shown in FIG. 1, volume 60 is equivalent to the volume of a totally expanded displacement mechanism cell 30. In the event the displacement of the displacement mechanism must be varied, the thickness of valve plate 11 may be varied, maintaining equality between volume 60 and the volume of an expanded cell 30.

DESCRIPTION OF THE OPERATION

Figure 2:
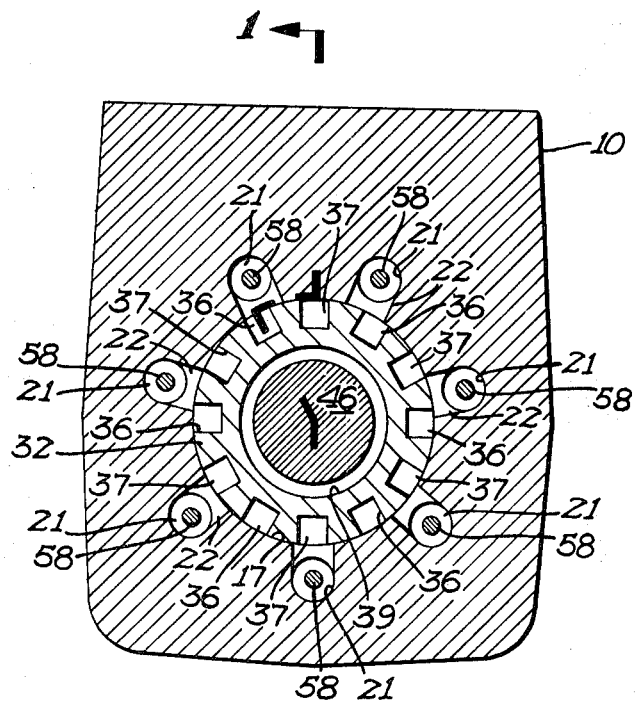
FIG. 2 is a sectional view taken along the line 2—2 of FIG. 1.

The operation of a fluid operated motor of the axial valve and gerotor displacement mechanism type is well-known and will not be described in detail herein, except as it pertains to the invention. Considering one direction of rotation of the fluid operated motor of this invention, fluid system operating fluid under pressure enters port 19 and surrounds annular groove 34 in valve 32. As shown in FIG. 2, predetermined of slots 36 are in fliud communication with openings 22 in valve housing section 10. Openings 22 are in fluid communication with passages 21 and the operating fluid confronts surface 55 of fluid interrupting piston 52. System operating fluid under pressure therefore urges fluid interrupting piston 52 toward valve plate 11 simultaneously urging displacement mechanism fluid in volume 60 inwardly into the corresponding expanding cells 30 in fluid communication with passages 21 and valve plate openings 24. Correspondingly, cells 30 on the other side of the line of eccentricity are contracting, urge displacement mechanism fluid outwardly therefrom correspondingly, from valve openings 24 to passages 21 in fluid communication therewith. Displacement mechanism fluid confronts the displacement mechanism fluid confronting surface 54 urging fluid interrupting piston 52 away from valve plate 11. Volume 60 is equal to the volume of expanded cell 30 and therefore accepts displacement mechanism fluid from the contracting cell. Indexing rod 58 contacts surface 59 preventing further movement of piston 52 away from valve plate 11 at the piston at which volume 60 equals expanded cell 30. The expansion and contraction of cells 30 continues during the operation of the motor in response to system operating fluid as is well-known in the art.

Since the fluid in the displacement mechanism is of a higher viscosity than would typically be the case in utilizing system operating fluid in the displacement mechanism, the efficiency of the displacement mechanism is increased since the leakage between high and low pressure cells is minimized due to the high viscosity of the fluid contained therein. On the other hand, if it is defined to maintain a given level of efficiency, by the decreased displacement mechanism cost, the high viscosity displacement mechanism fluid allows utilization of a gerotor set manufactured to machining tolerances considerably less than tolerances required for the manufacture of a gerotor set used with typical system operating fluids.

During the operation of the motor, displacement mechanism fluid is forced, during contraction of a predetermined cell 30, into volume 60 which increases in volume as fluid interrupting piston 52 returns to its indexed position away from volume plate 11. Volume 60 is at a maximum when rod 58 contacts surface 59 preventing further movement away from valve plate 11. Volume 60 is variable and equal to the volume of cell 30 when expanded. If it is desired to change the capacity of the displacement mechanism, the displacement mechanism thickness is varied accordingly and volume 60 is varied by simply varying the thickness of valve plate 11, thereby maintaining equality between the volume of expanded cell 30 and volume 60 with the fluid interrupting piston disposed away from valve plate 11.

From the foregoing it will be seen that a new and novel fluid operated motor of the axial valve type having a highly efficient displacement mechanism operable with high pressure system operating fluid has been provided. Further, it will be seen that a fluid operated motor of the axial valve type has been provided wherein the displacement mechanism is responsive to a low viscosity operating fluid while utilizing a high viscosity fluid in the displacement mechanism thereof providing a corresponding increase in efficiency. Since it is well-known that a high viscosity fluid is less likely to leak through a given size opening than a low viscosity fluid, it will be less likely to leak through a given size opening than a low viscosity fluid, it will be seen that the displacement mechanism which utilizes a high viscosity fluid need not be manufactured to the tolerance requirements of a displacement mechanism utilizing a low viscosity fluid for a given efficiency requirement. Obviously, since a conventional power steering unit embodies all of the structure and components of a hydraulic motor, the foregoing invention is equally applicable to the displacement mechanism, or meter, of a power steering device.

I claim:
1. A fluid operated motor of the axial valve type, said motor adapted to respond to system operating fluid and comprising
   a generally cylindrically shaped housing having a longitudinal axis, said housing having a central bore therein concentric with the axis, inlet and outlet ports for system operating fluid in fluid communication with the housing bore, a plurality of axially extending and circumferentially spaced piston receiving passages in fluid communication with the bore in said housing,
   a displacement mechanism connected to said housing and including an internally toothed ring gear having an axis coextensive with the longitudinal axis of said housing, and an externally toothed star gear having at least one less tooth than said ring gear and having an axis, said star gear disposed eccentrically in said ring gear for orbital movement about the axis of said ring gear and rotational movement about its own axis in the opposite direction from said orbital movement during relative movement between said members, whereby expanding and contracting cells are formed, which cells are equal in number to and in registry with the piston receiving passages of said housing, said displacement mechanism adapted to contain displacement mechanism fluid having a viscosity higher than the viscosity of said system operating fluid,
   a valve plate having a plurality of openings therein, each opening having a predetermined configuration and positioned in registry with the piston receiving passages in said housing, said valve plate sandwiched between said displacement mechanism and said housing,
   an output shaft rotatably mounted in said housing for rotation substantially about the longitudinal axis thereof,
   drive means connecting said output shaft with said displacement mechanism,
   a cylindrically shaped axial valve mounted in the bore of said housing for rotational movement about the longitudinal axis thereof, said valve having a pair of axially spaced annular grooves, one in fluid communication with the inlet port and the other in fluid communication with the outlet port, said valve having a plurality of axially extending and circumferentially spaced slots in fluid communication with one of the annular grooves of said valve and a plurality of alternately spaced axially extending and circumferentially spaced slots in fluid communication with the other of the annular grooves whereby system operating fluid is alternately conveyed to and from the piston receiving passages in said housing,
   valve drive means connecting said valve with said displacement mechanism from synchronous rotation therewith, and
   a plurality of fluid interrupting pistons slideably mounted in the piston receiving passages in said housing, said fluid interrupting pistons adapted to separate displacement mechanism fluid from system operating fluid and including a displacement mechanism fluid confronting surface and an operating fluid confronting surface, the operating fluid confronting surface adapted to respond to operating fluid under pressure and the displacement mechanism fluid confronting surface adapted to respond to displacement mechanism fluid under exhaust whereby displacement mechanism cells may be alternately contracted and expanded in response to system operating fluid and separated therefrom.

2. The fluid operated motor of claim 1 wherein said fluid interrupting piston includes an annular sealing ring.

3. The fluid operated motor of claim 1 wherein the displacement mechanism includes a displacement mechanism fluid having a viscosity higher than the viscosity of the system operating fluid.

4. The fluid operated motor of claim 1 wherein said fluid interrupting pistons include a head element having diameter greater than the diameter of the valve opening in registry therewith whereby said fluid interrupting piston movement is indexed thereat.

5. The fluid operated motor of claim 1 wherein said fluid interrupting pistons include a head element having an indexing rod projecting axially outwardly from the operating fluid confronting surface thereof thereby indexing said fluid interrupting piston a predetermined distance from said valve plate.

6. The fluid operated motor of claim 1 wherein the displacement mechanism fluid confronting surface, the valve plate opening and the piston receiving passage therebetween defines a variable volume adapted to receive displacement mechanism fluid from a contracting cell in registry therewith.

7. The fluid operated motor of claim 6 wherein the displacement mechanism fluid confronting surface, the valve plate opening and the piston receiving passage therebetween defines a volume equal to the volume of an expanded displacement mechanism cell in registry therewith.

8. The fluid operated motor of claim 6 wherein the valve plate has a predetermined thickness whereby the displacement mechanism fluid confronting surface, the valve plate opening and the piston receiving passage therebetween defines a volume equal to the volume of an expanded displacement mechanism cell.

References Cited

UNITED STATES PATENTS 3,352,247　12/1965　Easton _____ 418—61

FOREIGN PATENTS 987,120　4/1951　France _____ 417—405

CARLTON R. CROYLE, Primary Examiner

J. J. VRABLIK, Assistant Examiner

U.S. Cl. X.R.

417—383, 392, 405